United States Patent [19]

Kinoshita

[11] Patent Number: 5,113,369

[45] Date of Patent: May 12, 1992

[54] 32-BIT PERSONAL COMPUTER USING A BUS WIDTH CONVERTER AND A LATCH FOR INTERFACING WITH 8-BIT AND 16-BIT MICROPROCESSORS

[75] Inventor: Tsuneo Kinoshita, Kokubunji, Japan

[73] Assignee: Kabushiki Kaisha Toshiba, Kawasaki, Japan

[21] Appl. No.: 402,967

[22] Filed: Sep. 6, 1989

Related U.S. Application Data

[63] Continuation of Ser. No. 889,196, Jul. 25, 1986, abandoned.

[30] Foreign Application Priority Data

Jul. 26, 1985 [JP] Japan ................................ 60-165374

[51] Int. Cl.$^5$ .................... G06F 13/40; G06F 13/00
[52] U.S. Cl. ............................ 395/325; 364/926.9;
 364/926.91; 364/927.92; 364/927.93; 364/931;
 364/931.1; 364/939; 364/939.3; 364/935;
 364/935.4; 364/935.42; 364/935.47; 364/231;
 364/232.8; 364/239; 364/239.7; 364/240;
 364/240.3; 364/DIG. 1; 364/DIG. 2
[58] Field of Search ... 364/200 MS File, 900 MS File

[56] References Cited

U.S. PATENT DOCUMENTS

| | | |
|---|---|---|
| 4,214,302 | 7/1980 | Schmidt .................... 364/200 |
| 4,245,300 | 1/1981 | Kaufman et al. .................. 364/200 |
| 4,275,455 | 6/1981 | Bartlett ........................ 364/200 |
| 4,447,876 | 5/1984 | Moore ......................... 364/200 |
| 4,467,447 | 8/1984 | Takahashi et al. ................ 364/900 |
| 4,490,785 | 12/1984 | Strecker et al. ................. 364/200 |
| 4,514,808 | 4/1985 | Murayama et al. ................ 364/200 |
| 4,523,276 | 1/1986 | Maejima et al. .................. 364/200 |
| 4,569,018 | 2/1986 | Hummel et al. .................. 364/200 |
| 4,590,556 | 5/1986 | Berger et al. ................... 364/200 |
| 4,593,267 | 6/1986 | Kuroda et al. .................. 364/900 |
| 4,633,437 | 12/1986 | Mothersole et al. .............. 364/900 |
| 4,677,548 | 6/1987 | Bradley ........................ 371/11 |
| 4,716,527 | 12/1987 | Graciotti ....................... 364/200 |
| 4,736,317 | 4/1988 | Hu et al. ....................... 364/200 |
| 4,766,538 | 8/1988 | Miyashi ........................ 364/200 |
| 4,831,514 | 5/1989 | Turlakov et al. ................. 364/200 |
| 4,845,611 | 7/1989 | Turlakov et al. ................. 364/200 |
| 4,860,198 | 8/1989 | Takenaka ...................... 364/200 |

Primary Examiner—Thomas C. Lee
Assistant Examiner—Krisna Lim
Attorney, Agent, or Firm—Finnegan, Henderson, Farabow, Garrett and Dunner

[57] ABSTRACT

A one-chip IC, having a function module for converting bus widths at least between 32 and 16 bits and between 32 and 8 bits and peripheral control function modules connected to an internal bus through the bus width-conversion function module, is arranged between various peripheral devices and a 32-bit microprocessor compatible with existing 16-bit personal computer software, thereby realizing a personal computer.

15 Claims, 3 Drawing Sheets

F I G. 3
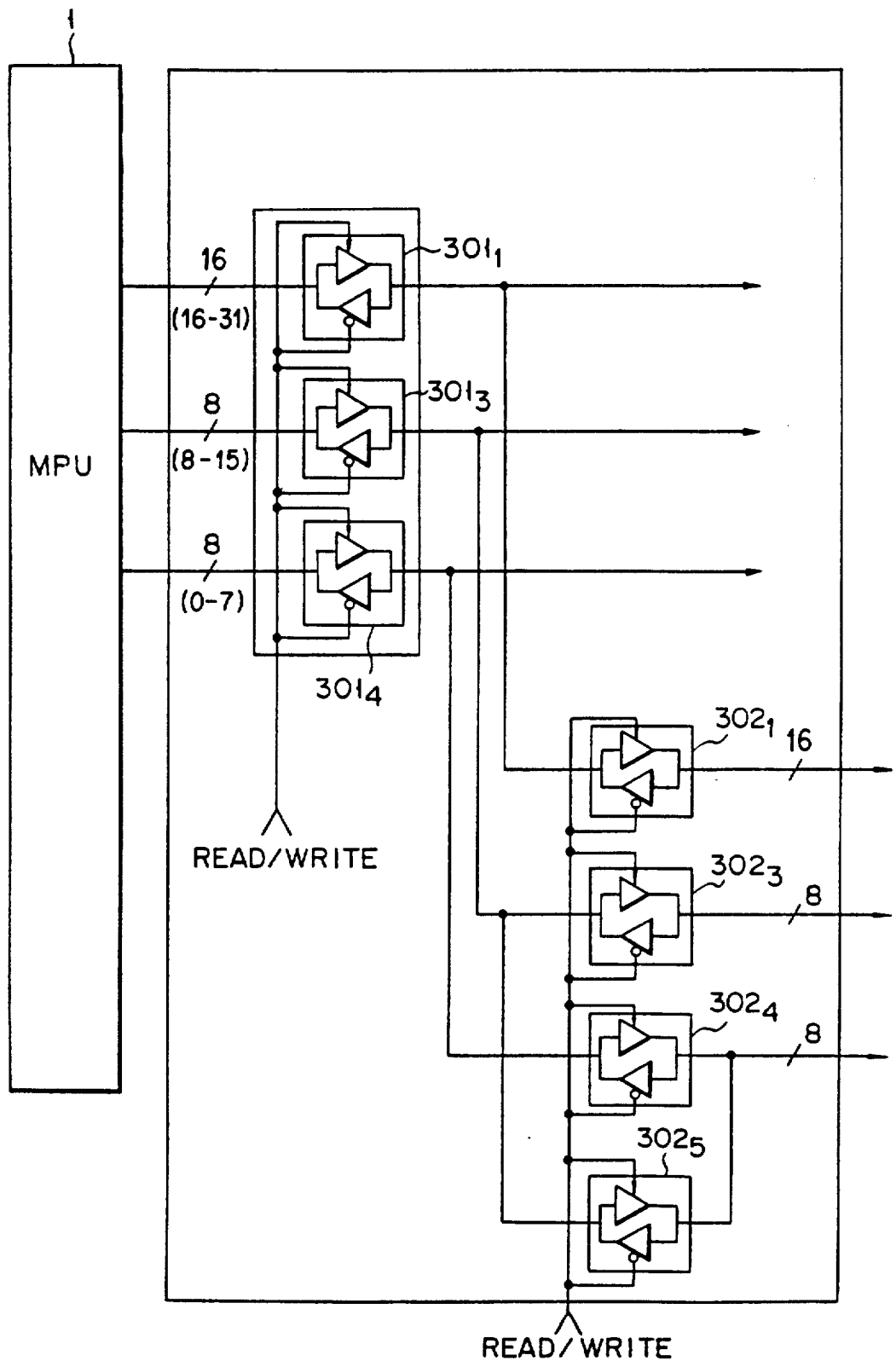

32-BIT PERSONAL COMPUTER USING A BUS WIDTH CONVERTER AND A LATCH FOR INTERFACING WITH 8-BIT AND 16-BIT MICROPROCESSORS

This application is a continuation of application Ser. No. 06/889,196, filed Jul. 25, 1986, now abandoned.

BACKGROUND OF THE INVENTION

The present invention relates to a personal computer configured using a 32-bit microprocessor.

Various types of personal computers, each having a combination of an 8-bit MPU (Micro Processing Unit) and a peripheral LSI family, are available as low-end computer products. Middle-end personal computers employing 16-bit MPUs compatible with 8-bit MPU software have recently been developed and are becoming popular. The 8-bit models are gradually being replaced by 16-bit models, through utilizing a wealth of software created on the 8-bit MPU basis.

In addition, 32-bit MPUs have recently been developed to configure top-end personal computers. Demand has thus arisen for personal computers utilizing combinations of 32-bit MPUs and existing peripheral LSI families.

However, the development of 32-bit MPUs has been protracted, compared with that of 16-bit MPUs, for the following reason: It is difficult to design architecture for establishing compatibility between 8-, 16-, and 32-bit MPUs. Therefore, it is difficult to establish compatibility between 32- and 16-bit personal computers.

SUMMARY OF THE INVENTION

It is an object of the present invention to provide a simple, low-cost personal computer having a 32-bit microprocessor compatible with existing 16-bit personal computer software.

In order to achieve the above object of the present invention, there is provided a personal computer comprising:

a microprocessor unit having compatibility at least between 8, 16, and 32 bits; and a peripheral-control large-scale integrated circuit arranged between the microprocessor unit and a peripheral device, and having a latch for latching 32-bit data from the microprocessor unit in units of 8 bits, an internal bus, a bus width-conversion function module for converting bus widths at least between 32 and 16 bits and between 32 and 8 bits, and peripheral device control modules, connected to the internal bus through the bus width-conversion function module, for controlling the peripheral device, the latch, the internal bus, the bus width-conversion function module, and the peripheral device control modules being formed on a single chip.

According to the present invention, a one-chip IC having the function module for converting the bus widths at least between 32 and 16 bits and between 32 and 8 bits, and the peripheral control function modules connected to the internal bus through the bus width-conversion function module, is arranged between the various peripheral devices and the 32-bit microprocessor compatible with existing 16-bit personal computer software, thereby realizing a personal computer. Therefore, a simple, low-cost, compact 32-bit personal computer compatible with existing 16-bit personal computer software can be provided.

BRIEF DESCRIPTION OF THE DRAWINGS

Other objects and features of the present invention will be apparent from the following description taken in connection with the accompanying drawings, in which:

FIG. 3 is a detailed circuit diagram of a latch in FIG. 1.

DETAILED DESCRIPTION OF THE PREFERRED EMBODIMENT

Figure 1:
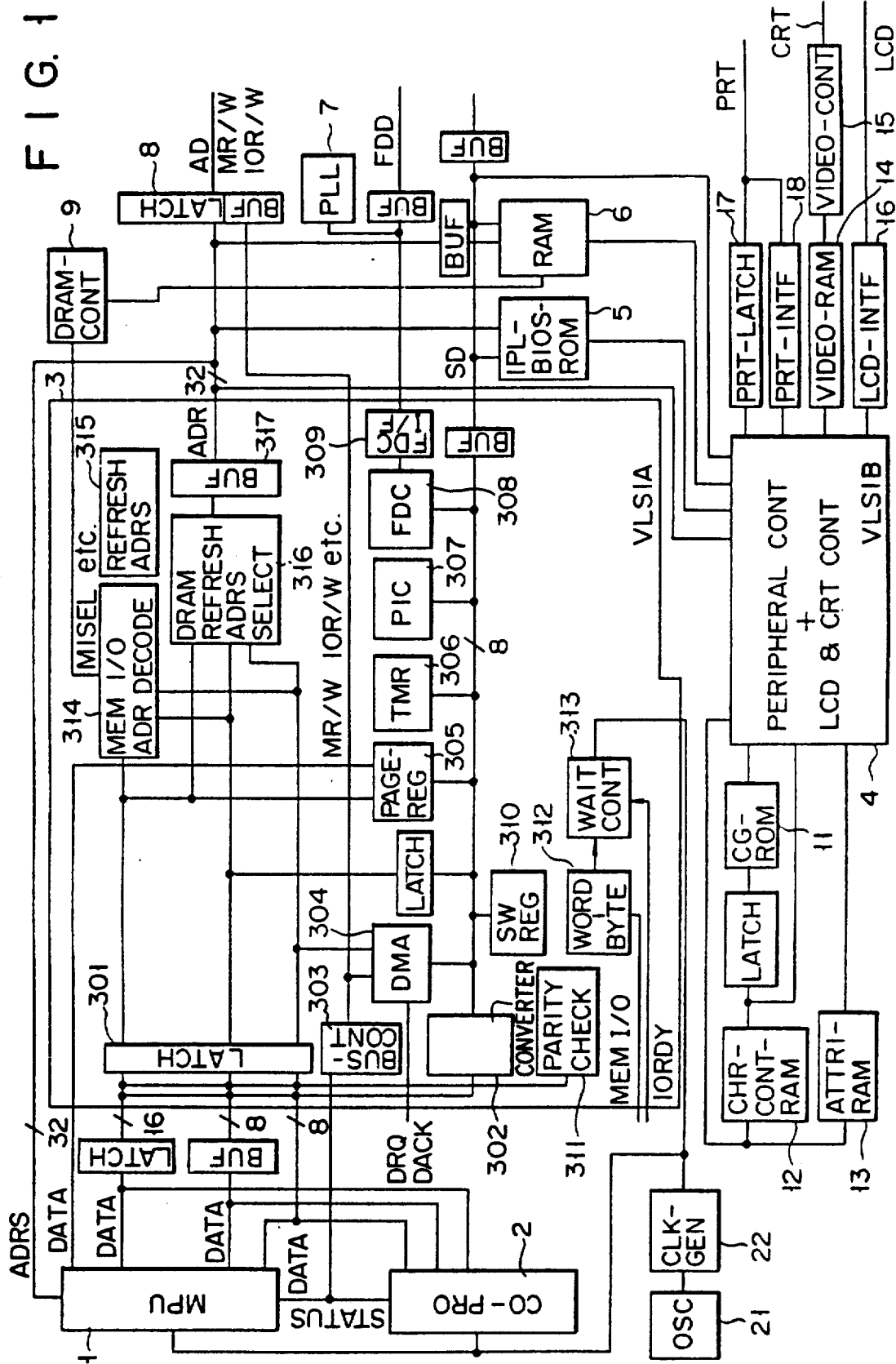
FIG. 1 is a block diagram of a personal computer according to an embodiment of the present invention.

FIG. 1 is a block diagram showing the main constituting components of a 32-bit personal computer according to an embodiment of the present invention.

MPU (Micro Processing Unit) 1 is compatible with 8-, 16-, and 32-bit MPU software. An iAPX386 available from Intel Corp., U.S.A. can be used as MPU 1. Computing processor (CO-PRO) 2 is an LSI having a floating computing function which is excluded from the functions of MPU 1. An iAPX387 available from Intel Corp., U.S.A. can be used as CO-PRO 2. Peripheral LSIs (VLSIA and VLSIB) 3 and 4 are arranged between MPU 1 and peripheral devices.

These peripheral LSIs can comprise combinations of VLSIs and discrete ICs, as in the conventional LSI family. More specifically, the peripheral LSIs are respectively VLSIs including personal computer control logic, excluding functions of MPU 1 and CO-PRO 2. These peripheral LSIs can be fabricated by integrated circuit techniques described in Japanese Patent Application Nos. 59-204462, 59-204455, and 59-204456. The constituent components in the peripheral LSIs will be described later. LSI (VLSIA) 3 controls and interfaces between the MPU bus and other devices, such as external devices and memories. LSI (VLSIB) 4 controls peripheral devices, such as a printer (PRT), a CRT display (CRT), an LCD display (LCD), and the like. Read-only memory (ROM) 5 is connected to the 8-bit bus in LSI 3, through a buffer (BUF), and stores BIOS (Basic I/O Software) and IPL (Initial Program Loader). Random-access memory (RAM) 6 is used as a main memory.

PPL (Phase Locked Loop) circuit 7 is connected to an FDD line connected to a floppy disk drive (FDD) as an external storage. Latch and buffer 8 stores a memory address, a memory read/write signal, an I/O read/write signal, and so on. Memory control circuit (DRAM-CONT) 9 is connected, in order to control RAM 6.

Circuit elements for controlling the peripheral devices connected to LSI 4 include character data-generating elements and an interface mechanism between LSI 4 and the peripheral devices. The character data-generating elements include: character-generator (CG-ROM) 11, character control RAM (CHR-CONT-RAM) 12, and attribute RAM (ATTRI-RAM) 13. The interface mechanism includes: video RAM (VIDEO-RAM) 14 and video controller (VIDEO-CONT) 15, both of which are arranged between peripheral LSI 4 and the CRT display (CRT); LCD interface (LCD-INTF) 16 arranged between LSI 4 and the LCD display (LCD); latch register (PRT-LATCH) 17 arranged between LSI 4 and the printer (PRT); and printer interface (PRT-INTF) 18. The personal computer in FIG. 1 also includes oscillator (OSC) 21 for generating operation clocks and clock generator (CLK-GEN) 22.

The operation of the personal computer having the arrangement described above will be described together with the internal components of LSI 3 and its function.

The 32-bit personal computer is operated according to the basic rules below:

(I) If a power switch is turned on, an initialize circuit of MPU 1 is activated. All other circuit blocks are reset in response to a reset signal from the initialize circuit.

After initialization, a start address is produced by MPU 1. A first instruction stored in ROM 5 is read out in response to the address signal and is fetched by MPU 1 through LSI 3. If a branch instruction is generated, the program is branched according to the condition represented by the branch instruction, and the program is sequentially executed.

(II) MPU 1 includes general registers, an arithmetic and logic unit (ALU), and arithmetic control logic circuits, such as a shifter, a memory protection control circuit, an instruction fetch-and-execution control circuit, and an instruction look-ahead buffer. Program execution and interrupt control are performed by MPU 1 (an individual LSI).

(III) Using the special circuit and program, computing processor (CO-PRO) 2 executes an instruction of a high order, such as a floating decimal instruction, which cannot be processed by MPU 1. A computed result is set in a general register in MPU 1. CO-PRO 2 receives from MPU 1 information representing MPU 1 fetching of an instruction to be executed by CO-PRO 2 from memory 5 and starts computation. The computed result is transferred from CO-PRO 2 to MPU 1.

(IV) Peripheral LSI (VLSIA) 3 is arranged between MPU 1 and other devices, such as the peripheral devices and the I/O interface including LSI 4 connected to the output of LSI 3, and controls the control signal flow and the data and address flow.

The constituent components of LSI (VLSIA) 3 will be described below:

a) Latch 301.

Latch 301 is connected to a combination of 16 and 8-bit data buses, one of which is directly connected to MPU 1, another of which is connected to a buffer which is then connected to MPU 1, and another of which is connected to a latch which is then connected to MPU 1. More specifically, latch 301 latches 32-bit data in units of 8 bits, i.e., in the form of four sets of 8-bit data. MPU 1 processes 32-bit data. LSI (VLSIA) 3 and the subsequent circuit blocks process 16- or 8-bit data. Therefore, software programmed by an 8- or 16-bit personal computer can be executed by a 32-bit personal computer.

b) Bus Width Converter (32 bits ←→8 bits) 302.

In order to maintain compatibility of the 32-bit processor with 8- or 16-bit computer software, converter 302 controls the bus width. Converter 302 selects one of the 8-bit data bytes from the 4×8 bits (=32 bits) to maintain compatibility with 8-bit computer software. Converter 302 also selects upper or lower 16-bit data among 32 bits to maintain compatibility with 16-bit computer software.

c) Bus Controller (BUS-CONT) 303.

Bus controller 303 decodes a bus control signal (the type of data on the data bus) from MPU 1 and the direction (i.e., read/write). The decoded data is sent to the subsequent interface.

d) DMA Controller (DMA) 304.

DMA controller 304 transfers data and the program between MPU 1 and the memories, as well as data between I/O devices and the memory. Controller 304 selectively assigns the data bus to MPU 1 or the I/O, so as to transfer data between the I/O device and the memory.

e) Page Register (PAGE-REG) 305.

The I/O device usually transmits/receives 8-bit data (e.g., in units of ASCII codes). Page register 305 is preferably connected to a 8-bit bus.

32-bit data from MPU 1 is input to page register 305, and 32-bit data from register 305 is sent to MPU 1. In other words, 4 bytes are simultaneously input to or output from page register 305. Register 305 accesses the addressed one of the four bytes.

f) Timer Circuit (TMR) 306.

Clock information is required in the peripheral devices or the like. Software timer 306 is arranged to arbitrarily set a time unit (e.g., milliseconds), and can be externally operated. In this embodiment, four timers are arranged thus.

g) Programmable Interrupt Controller (PIC) 307.

Programmable interrupt controller 307 controls interrupt priority and mask conditions.

h) Floppy Disk Controller (FDC) 308 and FDC Interface (FDC-INTF) 309.

Floppy disk controller 308 is a circuit for controlling input/output of a floppy disk. FDC interface 309 is a buffer register for interfacing with floppy disk drive (FDD) (not shown).

i) Transfer Control Register (SW-REG) 310.

Transfer control register 310 is a buffering register for controlling transfer of 32- or 8-bit data.

j) Parity Check Circuit (PARITY-CHECK) 311.

Parity check circuit 311 detects a parity error on the data bus and generates a parity bit.

k) Word/Byte Controller (WORD→BYTE) 312 and Wait Controller (WAIT-CONT) 313.

Word/byte controller 312 controls switching between 8- and 16-bit data. Wait controller 313 controls timings for minimizing the memory access wait time.

l) Memory-I/O.Address-Decode Circuit (MEM-I/O.ADR-DECODE) 314, Refresh Address Circuit (REFRESH-ADRS) 315, Memory Address Selector (D-RAM REFRESH ADRS-SELECT) 316, and Memory Address Buffer (BUF) 317.

These circuits perform refresh control, address decoding (including control of RAS and CAS signals), and memory access control, such as read/write mode control, if the main memory comprises a dynamic RAM (D-RAM).

The circuits in items (a) through (i) above are integrated on a single LSI as LSI 3. LSI (VLSIA) 3 deals with the respective circuit blocks as macro cells. These cells are formed on a single chip by superintegration (SI) techniques.

(V) Peripheral LSI (VLSIB) 4.

Peripheral LSI (VLSIB) 4 has an internal function logic different from that of LSI (VLSIA) 3. LSI 4 directly controls the printer (PRT), the CRT display (CRT), the LCD display (LCD), character generator (CG-ROM) 11 for generating kanji characters, and the like. VLSIB 4 can be connected to the printer (PRT) (not shown) through latch register (PRT-LATCH) 17. VLSIB 4 can also be connected to the CRT display (CRT) (not shown) through video RAM (VIDEO-RAM) 14 and video controller (VIDEO-CONT) 15, and to the LCD display (LCD) (not shown) through LCD interface (LCD-INTF) 16. VLSIB 4 transfers data including the kanji codes to these display devices.

The kanji code has a font conversion function, so as to vertically or horizontally display the characters. Display modifications (enlargement, reduction, rotation, etc.) can be performed on the CRT display.

(VI) Memory

Memories comprise ROM 5, RAM 6, and the like.

ROM 5 stores BIOS (Basic I/O Software), IPL (Initial Program Loader), and so on.

(VII) Clock Generator (CLK-GEN) 22.

Clock generator 22 is a circuit for clocking the personal computer as a whole.

A buffer (BUF) is connected to the memory bus to achieve external expansion without modifications.

Figure 2:
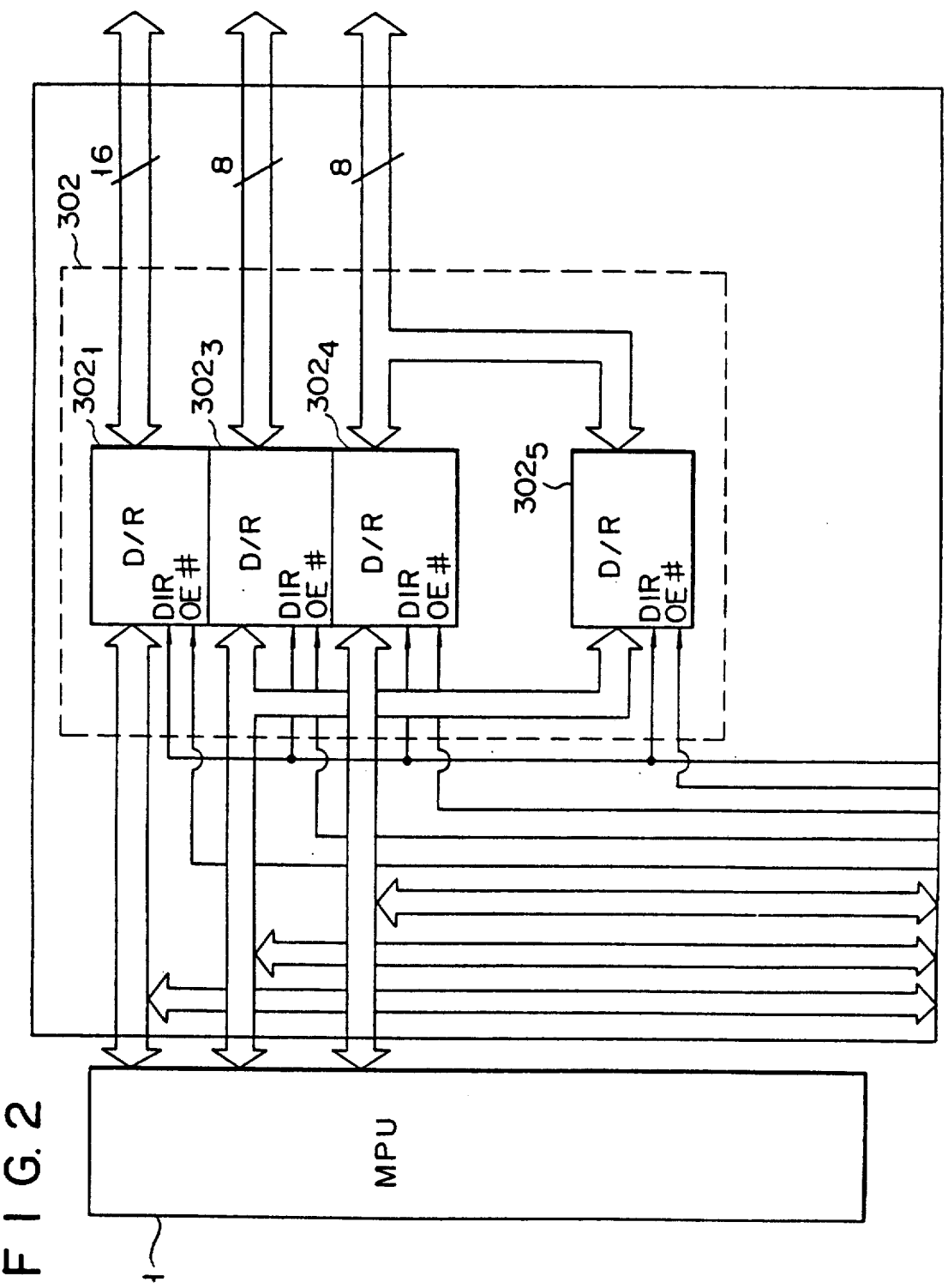
FIG. 2 is a detailed block diagram of an 8- to 32-bit converter in FIG. 1.

FIG. 2 is a detailed block diagram of bus width converter 302 in FIG. 1. Referring to FIG. 2, the bus width converter comprises 16-bit line driver/receiver $302_1$, and the 8-bit line drivers/receivers $302_3$, $302_4$, and $302_5$. Read/write direction control and strobe signals are supplied to each of drivers/receivers $302_1$, $302_3$, $302_4$, and $302_5$. Driver/receiver $302_1$ is arranged to output 16-bit data upon reception of the upper bits 16-31 of data from MPU 1. Driver/receivers $302_3$ and $302_4$ are arranged to output parallel 16-bit data upon reception of the lower bits 0-15 of data bits from MPU 1. Driver/receiver $302_4$ and $302_5$ are each arranged to output serial 8-bit data upon reception of the lower bits 0-15 of data from MPU 1. More specifically, the lower 8 bits of data 0-7 is output through driver/receiver $302_4$, and the upper 8 bits of data 8-15 is output through driver/receiver $302_5$.

FIG. 3 is a detailed circuit diagram of latch 301 and converter 302 in FIG. 1. Referring to FIG. 3, latch 301 comprises two 8-bit line drivers/receivers $301_3$ and $301_4$ and 16-bit driver/receiver $301_1$. Read/write direction control signals are respectively supplied to drivers/receivers $301_1$, $301_3$, and $301_4$, and outputs therefrom are connected as 32-bit data to be input into an external 32-bit memory or sent along the main bus of another system. The outputs from drivers/receivers $301_1$, $301_3$, and $301_4$ are also connected to bus width converter 302. If converter 302 outputs 8-bit data, it enables one of drivers/receivers $302_3$ or $302_4$. However, if converter 302 outputs the lower 16 bits of data 0-15 in parallel, it enables both drivers/receivers $302_3$ and $302_4$. In addition, if 16-bit serial data is to be generated, bits 8 through 15 are output through driver/receiver $302_5$, and bits 0 through 7 are output through driver/receiver $302_4$. First, driver/receiver $302_4$ is enabled and driver/receiver $302_5$ is disabled by MPU 1. Thereafter, driver/receiver $302_4$ is disabled and driver/receiver $302_5$ is enabled.

The 32-bit personal computer can be made compact, since it comprises MPU 1, computing processor 2, peripheral LSI 4, ROM 5, and RAM 6, as the major constituent components.

By utilizing the 32-bit functions of MPU 1, the internal logic functions of the personal computer, including the bus width-conversion function of peripheral LSI (VLSIA) 3, allow connections with 16- or 8-bit external devices. Therefore, the 32-bit personal computer can be compatible with existing 8- and 16-bit personal computer software, and the overall system can be simple and inexpensive.

It will be apparent to those skilled in the art that various modifications and variations can be made in the personal computer of the present invention without departing from the scope or spirit of the invention. For example, various implementations of latch 301 can be used to latch 32-bit data in units of 8 bits. Thus, it is intended that the present invention cover the modifications and variations of this invention provided they come within the scope of the appended claims and their equivalents.

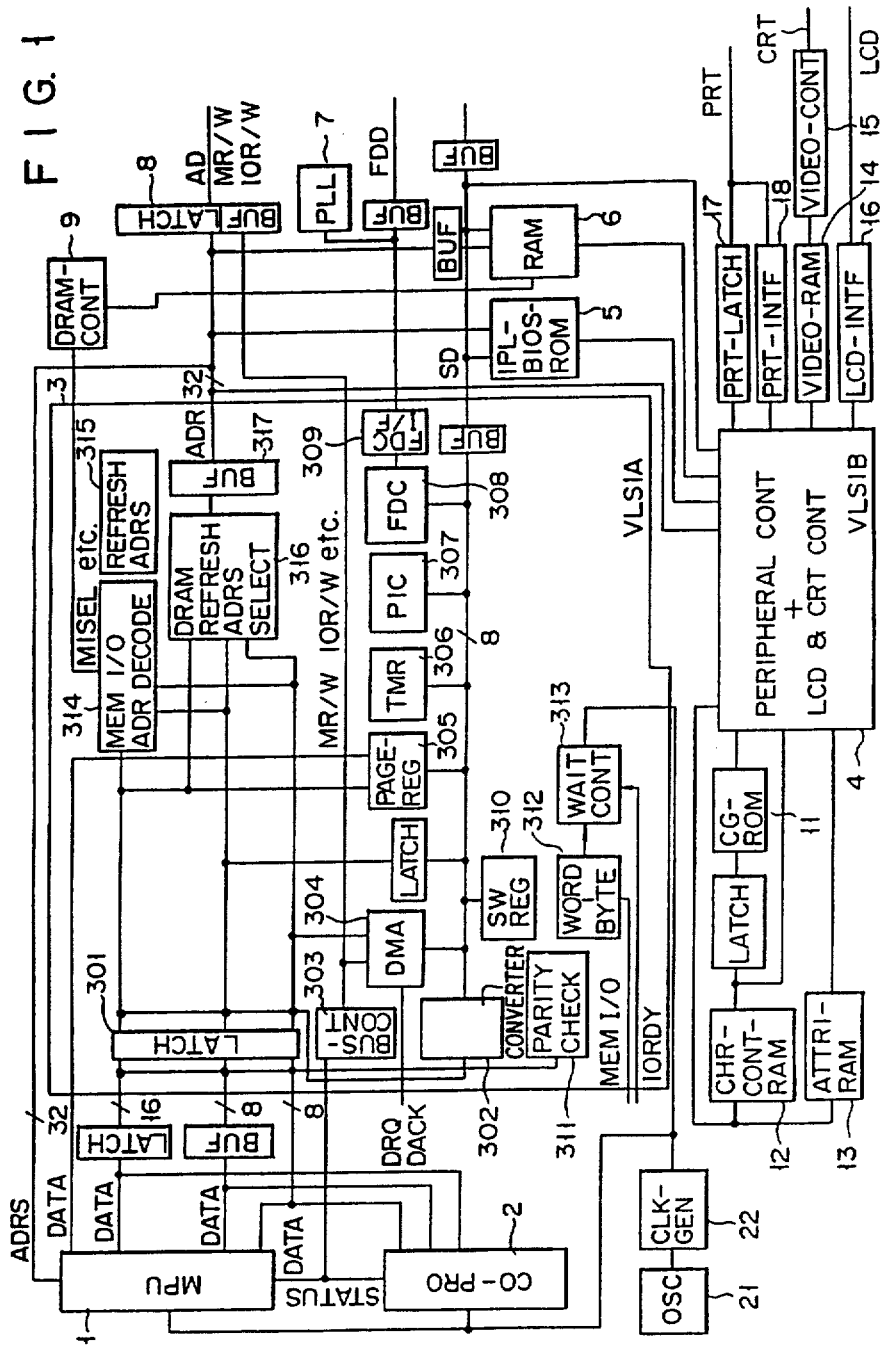

What is claimed is:

1. A personal computer comprising:
   a 32-bit microprocessor having compatibility with 8-bit and 16-bit microprocessors;
   a peripheral-control large-scale integrated circuit arranged between said microprocessor unit and a plurality of peripheral devices, including:
   latch means, coupled to said microprocessor unit, for latching 32-bit data from said microprocessor unit in units of 8 bits,
   common internal bus means, coupled to said latch means, for transferring data and addresses, and
   a bus width conversion means, coupled through said internal bus means to said latch means, for receiving 32-bit data from said latch means, for converting bus widths at least between 32 and 16 bits by selecting for output any two of the four 8-bit data units received from the latch means, and between 32 and 8 bits by selecting for output any one of the four 8-bit data units received from the latch means, and for outputting only the selected data bits onto said internal bus means; and peripheral device control modules, coupled to said bus width conversion means through said internal bus means, for receiving said converted bits from said bus width conversion means and for controlling said peripheral devices.

2. A computer according to claim 1, wherein said bus width conversion means comprises a plurality of line drivers/receivers for converting the 32-bit bus width into a 16-bit bus width or into an 8-bit bus width, and an additional line driver/receiver is provided for outputting the 16 bits in units of 8 bits and in bit serial form to said peripheral devices.

3. A personal computer comprising:
   a thirty-two-bit microprocessor;
   a thirty-two-bit microprocessor bus;
   internal bus means for transferring data and addresses;
   latch means, coupled to the microprocessor bus and to the internal bus means, for latching thirty-two-bit data from the microprocessor bus in the form of four right-bit data units;
   a peripheral device;
   I/O interface means, coupled to the internal bus means and to the peripheral device, for receiving data from the internal bus means and for controlling the peripheral device;
   bus width converter means, coupled to the latch means and to the I/O interface means via the internal bus means, for receiving data from the latch means, for selecting for output one of the four eight-bit data units received from the latch means to convert the bus width to eight bits, for selecting for output two of the four eight-bit data units received from the latch means to convert the bus width to sixteen bits, and for outputting the selected eight-bit data units to the I/O interface means;
   wherein the microprocessor is compatible with eight- and sixteen-bit microprocessor software.

4. A personal computer in accordance with claim 3, in which the latch means includes a plurality of drivers/receivers for storing and transferring four eight-bit data units.

5. A personal computer in accordance with claim 3, in which the bus width converter means includes a plurality of drivers/receivers for storing and transferring the four eight-bit data units received from the latch means.

6. A personal computer in accordance with claim 5, in which the bus width converter means includes a first driver/receiver for storing and transferring both a first and a second eight-bit data unit received from the latch means, a second driver/receiver for storing and transferring a third eight-bit data unit received from the latch means, and a third driver/receiver for storing and transferring a fourth eight-bit data unit received from the latch means.

7. A personal computer in accordance with claim 6, in which the bus width converter means includes a fourth driver/receiver for storing the third eight-bit data unit received from the latch means, and wherein the third and fourth eight-bit data units are serially output on the same lines of the internal bus means by the fourth driver/receiver and the third driver/receiver, respectively, at times when sixteen-bit data is received from the latch means.

8. A personal computer in accordance with claim 7, in which the latch means and the bus width converter means are included in a large scale integrated circuit.

9. A personal computer in accordance with claim 6, in which the latch means and the bus width converter means are included in a large scale integrated circuit.

10. A personal computer in accordance with claim 6, in which the I/O interface means is included in a first large scale integrated circuit and in which the latch means and the bus width converter means are included in a second large scale integrated circuit.

11. A personal computer in accordance with claim 5, in which the latch means and the bus width converter means are included in a large scale integrated circuit.

12. A personal computer in accordance with claim 5, in which the I/O interface means is included in a first large scale integrated circuit and in which the latch means and the bus width converter means are included in a second large scale integrated circuit.

13. A personal computer in accordance with claim 3, in which the latch means and the bus width converter means are included in a large scale integrated circuit.

14. A personal computer in accordance with claim 3, in which the I/O interface means is included in a first large scale integrated circuit and in which the latch means and the bus width converter means are included in a second large scale integrated circuit.

15. A personal computer in accordance with claim 3, in which the I/O interface means is included in a large scale integrated circuit.

* * * * *

UNITED STATES PATENT AND TRADEMARK OFFICE
CERTIFICATE OF CORRECTION

PATENT NO. : 5,113,369  Page 1 of 2
DATED : May 12, 1992
INVENTOR(S) : Tsuneo KINOSHITA It is certified that error appears in the above-identified patent and that said Letters Patent is hereby corrected as shown below:

Claim 1, column 6, line 30, should run into line 29 (incorrect line break between "bus" and "width").

Claim 3, column 6, line 56, change "right-bit" to --eight-bit--.

Abstract, line 3, change "peripheral control" to --peripheral-control--.

Attached is a corrected Figure 1, change the connection of the input of bus width converter 302 from the three inputs of latch 301 to the three outputs of latch 301.

Signed and Sealed this

Eleventh Day of January, 1994

Attest:

BRUCE LEHMAN

Attesting Officer  Commissioner of Patents and Trademarks